United States Patent
Reynar et al.

(10) Patent No.: US 6,415,258 B1
(45) Date of Patent: Jul. 2, 2002

(54) BACKGROUND AUDIO RECOVERY SYSTEM

(75) Inventors: Jeffrey C. Reynar, Woodinville; David Allen Caulton, Redmond; Erik Rucker; Paul Kyong Hwan Kim, both of Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/413,262

(22) Filed: Oct. 6, 1999

(51) Int. Cl.[7] .................. G10L 19/14; G10L 21/06; G10L 15/26; G10L 15/04
(52) U.S. Cl. .................. 704/275; 704/270; 704/235; 704/251; 704/201
(58) Field of Search .................. 704/231, 233, 704/235, 251, 275, 270, 201

(56) References Cited

U.S. PATENT DOCUMENTS 5,764,852 A * 6/1998 Williams .................. 704/233
6,122,614 A * 9/2000 Kahn et al. .................. 704/235
6,202,050 B1 * 3/2001 Chen .................. 704/275

* cited by examiner

Primary Examiner—Richemond Dorvil
Assistant Examiner—Daniel A. Nolan
(74) Attorney, Agent, or Firm—Merchant & Gould P.C.

(57) ABSTRACT

A background audio recovery system displays an inactive status indicator for a speech recognition program module in an application program. To prevent losses of dictated speech when a speech recognition program module is inadvertently assigned to an inactive mode, the background audio recovery system determines whether an audio input device is receiving audio. If audio is being received by the audio input device, the background audio recovery system stores the audio data for later retrieval by the user. When a user issues a command to activate the speech recognition program module, the background audio recovery system initiates a background audio program module for manipulating the stored audio data that was recorded while the speech recognition program module was assigned to an inactive mode.

24 Claims, 10 Drawing Sheets

BACKGROUND AUDIO RECOVERY SYSTEM

TECHNICAL FIELD

This invention relates generally to the field of multi-source data processing systems and, more particularly, to a background audio recovery system for speech recognition systems/software.

BACKGROUND OF THE INVENTION

Since the advent of the personal computer, human interaction with the computer has been primarily through the keyboard. Typically, when a user wants to input information or to enter a command into a computer, he types the information or the command on the keyboard attached to the computer. Other input devices that have supplemented the keyboard as an input device include the mouse, touch-screen displays, integrated pointer devices, and scanners. Use of these other input devices have decreased the amount of user time spent in entering data or commands into the computer.

Computer-based voice recognition and speech recognition systems have also been used for data or command input into personal computers. Speech recognition systems convert human speech into a format that can be understood by the computer. When a computer is equipped with a speech recognition system, data and command input can be performed by merely speaking the data or command to the computer. The speed at which the user can speak is typically faster than conventional data or command entry. Therefore, the inherent speed in disseminating data or commands through human speech is a sought after advantage of incorporating and speech recognition systems into personal computers.

The increased efficiency of users operating personal computers equipped with voice recognition and speech recognition systems has encouraged the use of such systems in the workplace. Many workers in a variety of industries now utilize voice recognition and speech recognition systems for numerous applications. For example, computer software programs utilizing voice recognition and speech recognition technologies have been created by DRAGON, IBM, and LERNOUT & HAUSPIE. When a user reads a document aloud or dictates to a voice recognition program, the program can enter the user's spoken words directly into a word processing program operating on a personal computer.

Generally, computer-based voice recognition and speech recognition programs convert human speech into a series of digitized frequencies. These frequencies are matched against a previously stored set of words, or phonemes. When the computer determines correct matches for the series of frequencies, computer recognition of that portion of human speech is accomplished. The frequency matches are compiled until sufficient information is collected for the computer to react. The computer can then react to certain spoken words by storing the human speech in a memory device, transcribing the human speech into a document for a word processing program, or executing a command in an application program.

However, voice recognition and speech recognition systems are not 100% accurate. Even with hardware and software modifications, the most efficient voice recognition and speech recognition systems can attain approximately 97–99% accuracy. Internal and external factors can affect the reliability of voice recognition and speech recognition systems. Internal factors dependent upon the recognition technology include the comparison between the finite set of words/phonemes and the vocabulary of words of a speaker. External factors include the environment such as regional accents, external noise, and the type of microphone can degrade the quality of the input, thus affecting the frequency of the user's words and introducing potential error into the word or phoneme matching.

Conventional speech recognition systems suffer from significant recognition error rates. Different solutions have been applied to increase the recognition rate and to decrease the number of recognition errors. One solution is to train the voice recognition or speech recognition program to recognize the frequencies for a specific human voice. In a speaker dependent speech recognition system, the system creates a voice profile that recognizes the pronunciation patterns unique to a specific human voice. Speech recognition systems that are not trained for a particular speaker are called speaker independent systems, and therefore are more prone to recognition errors due to regional accents or differences in pronunciation.

Another solution uses a method called discrete speech input. Discrete speech input requires the operator to speak relatively slowly, pausing between each word, before speaking the next word. The pausing of the operator gives the speech recognition system an opportunity to distinguish between the beginning and the end each operator's word. Recognition systems relying upon discrete speech input are slow and cumbersome for users accustomed to speaking at a normal conversational speed.

An alternative solution involves a method based upon continuous speech input. Continuous speech input systems require the user to speak a limited set of words that have been previously stored in the system vocabulary. Therefore, the speech recognition system relies upon a limited vocabulary of words. Optimum use of these systems occurs when the system is utilized by users in an environment with a specific vocabulary. For example, continuous speech input systems have been implemented in the medical industry in specific fields such as radiology, orthopedics, internal medicine, emergency medicine, mental health, etc. However, continuous speech input systems are limited by their inherent deficiencies of vocabulary, which limits their ability to be used in other industries or work environments.

Natural speech input systems will ultimately reach the marketplace. These systems will not require the user to speak in any particular way for the computer to understand, but will be able to understand the difference between a user's command to the computer and information to be entered into the computer.

Throughout the remainder of this disclosure, the terms "voice recognition" and "speech recognition" may be used interchangeably. In some instances, a distinction is made between voice recognition and speech recognition. However, both voice recognition and speech recognition systems suffer from some of the same reliability problems described above, and the same solutions have been applied to both recognition technologies to resolve the shortcomings of the prior art.

Problems of Conventional Art to Be Solved by the Present Invention

Many multi-source data processing systems include voice recognition software. As described above, conventional voice and speech recognition software has many drawbacks. One major drawback is that an application program employing the voice or speech recognition software, such as a word processing program, frequently loses or does not properly capture dictation generated by a user.

There are two major reasons for not properly capturing dictation: One of the major reasons for this lost dictation is that users frequently forget to activate the speech recognition software because the microphone status indicators or icons are difficult to locate on a display device. Another reason why dictation is not properly capture is that, frequently, users assume that the microphone of the speech recognition software was turned on and start to dictate their thoughts. However, after a few minutes, the users discover that their voice commands and/or dictation were not recorded or properly processed by the speech recognition software. In such situations, users have to "turn-on" or "wake-up" the speech recognition software and re-dictate their thoughts.

Another cause of lost dictation is that the computers supporting the speech recognition software often have very slow processing speeds. Speech recognition software typically requires increased processing power relative to everyday applications, and many conventional computers do not sufficiently meet the needs of speech recognition software. In conventional computers, users may often utter a command and assume the command was properly captured by the computer. Then, the user proceeds directly to dictation. If the software did not capture the "turn on" command, then, any of the utterances made by the user would not be captured. In such cases, users must re-dictate their utterances so that this information will be captured by the computer.

Some of the conventional speech recognition software has attempted to solve these problems by providing a more visible microphone status indicator or icon. However, this quick fix or simple solution does not completely solve the aforementioned problems. Although a more visible microphone indicator or icon may reduce the likelihood of users inadvertently dictating without the speech recognition software being activated, many users will still not notice or observe the microphone status indicator or icon.

For example, many users dictate while looking at written materials such as notes or books on their desk and thus, such users do not look at the display device. For these users, a more visible microphone status indicator or icon will not alleviate the problem of lost dictation. Also, even with the increased size of the microphone status icon or indicator, users of speech recognition software still must wait a significant amount of time for the speech recognition software to become activated or "turned on" because of the slow processing speeds of conventional computers.

Other problems of prior art voice recognition software include mistakes in the processing of speech where the speech recognition software inadvertently replaces spoken words with words that are phonetically similar. For example, the word "apparently" may be interpreted by voice recognition software as the phrase "a parent."

Accordingly, there is a general need in the art for a background audio recovery system for use with a computer system that records and processes dictated speech that is generated while the speech recognition software is assigned to an inactive state. There is a further need in the art for a background audio recovery system that replays the actual background audio generated by a user in order to provide enhanced editing capabilities for the processed speech. There is a further need for a background audio recovery system that permits a user to edit background audio prior to entry of background audio into an open document of an application program.

SUMMARY OF THE INVENTION

The present invention is generally directed to a background audio recovery system having a speech recognition program module that can record audio and then apply speech recognition techniques to the recorded background speech or audio that was received from a microphone when the speech recognition program module was inadvertently assigned to an inactive mode. This continuous recording of all background audio or speech received from a microphone while the speech recognition program module is assigned to an inactive mode prevents loss of dictation from a user.

As stated above, the background audio recovery system of the present invention continuously saves background speech or audio when the speech recognition program module is assigned to an inactive state. When a user realizes that the microphone for the speech recognition program module was not "turned on" or was designated to be inactive, the user then properly "turns on" the microphone by either a spoken command word or keyed entry. The speech recognition program module prompts the application program if background speech or audio has been saved prior to the "turning on" or activation of the speech recognition program module.

If background audio or speech has been saved, the background audio recovery system informs the user that background speech prior to the activation of the microphone (or the activation of the speech recognition module) has been saved and is available to be converted and inserted into the current open document of the application program. The user is given at least one of the following options: (1) process and convert the background audio or speech to text, and display the text after applying spoken commands in a separate user interface; (2) process and convert the background audio or speech to text, and display the text with the spoken commands listed as text in a separate user interface; (3) process and convert the background audio or speech to text, and insert the text into the current open document without any editing; or (4) delete the background audio or speech.

If the user decides to process and convert the background speech to text, the background audio recovery system will convert the background speech to text with the speech recognition program module. The background audio recovery system will then display the converted background speech or text to the user via a user interface typically in the format of a separate dialog box or window before the text is inserted into the current open document of the application program or word processing system.

The background audio recovery system further prompts the user with additional editing options for the converted text. For one embodiment of the present invention, all the background speech is treated as text even if spoken commands were issued during the generation of the background speech. In another embodiment of the present invention, spoken or dictated commands are processed as commands and the user can determine whether each command is to be executed on corresponding background speech that is converted to text.

In a further embodiment, actual audio or speech received by the microphone is also saved in a memory device in a low fidelity format so that a user can play back actual audio to enhance the editing process of the converted text.

The present invention gives the user more control over the retrieval of "lost" dictation to be inserted into an open document of a word processing system. Such control exists when commands and associated converted background speech are displayed in a separate dialog box before the converted background speech is inserted into the current open document of the word processing system. In other words, the present invention does not force the user to simply insert or "dump" the contents of the converted background speech into an open document.

The present invention permits a user to "turn on" the microphone "retroactively" and provide a display of options with how to insert the converted background speech into the open document. The present invention also allows the user to set the bounds for the background speech processing where the user designates the amount of time or memory that should be utilized to prevent dictation losses. Further, the present invention also permits the user to "turn on" the microphone "proactively" where the recorded background speech or audio is discarded and the word processing system is ready to receive the users' forthcoming speech.

More specifically described, the present invention is a background audio recovery system that includes an application program, such as a word processing program. The background audio recovery system displays an inactive status indicator for a speech recognition program module in an application program on a display device. The background audio recovery system then determines whether an audio input device is receiving audio input, such as speech or voice from a user. If audio is being received by the audio input device (i.e., a microphone), the background audio recovery system stores the audio data in a memory device. Alternatively, the background audio recovery system can convert the speech into text prior to saving to a memory device.

The background audio recovery system determines whether a command for activating the speech recognition program module has been issued and, if so, the background audio recovery system initiates a background audio program module for manipulating the stored audio.

According to an aspect of the present invention, the background audio recovery system stores background audio in cache memory of a central processing unit. According to another aspect of the present invention, the application program is a word processing program that is designed to manipulate stored data.

The background audio recovery system can determine whether a command for activating the application program has been issued by detecting the command from either a keyboard interface or an audio input device such as a microphone. According to yet another aspect of the present invention, the background audio recovery system can display a graphical user interface, such as a dialog box, on a display device. The background audio recovery system then can display a list of options for stored background audio within this graphical user interface.

The background audio recovery system can convert speech within the background audio to text data and then display the text data on a display device where the text data includes textual application program commands that have not been applied to the text data. In another aspect of the present invention, the background audio recovery system can apply the spoken commands to the other stored text data and then display the processed text data on a display device.

The background audio recovery system can also convert speech within the background audio into text data and insert the converted text data into an open file being accessed by the application program. The text data can include textual application program commands that have not been applied to the text data.

The background audio recovery system can also prompt a user to delete the stored audio data from a memory device. According to yet another aspect of the present invention, the background audio recovery system can store the background audio as a sound file in a memory device. The background audio recovery system then can convert speech within the background audio to text data and then display the converted text data on a display device while replaying the background audio from the sound file of the memory device. The background audio recovery system permits the user to denote at least one of a time increment, file size increment, and value in order to allocate a predefined size for the audio files containing recorded speech.

That the present invention improves over the drawbacks of the prior speech recognition software and accomplishes the advantages described above will become apparent from the following detailed description of the exemplary embodiments and the impended drawings and claims.

DETAILED DESCRIPTION OF EXEMPLARY EMBODIMENTS

Figure 1:
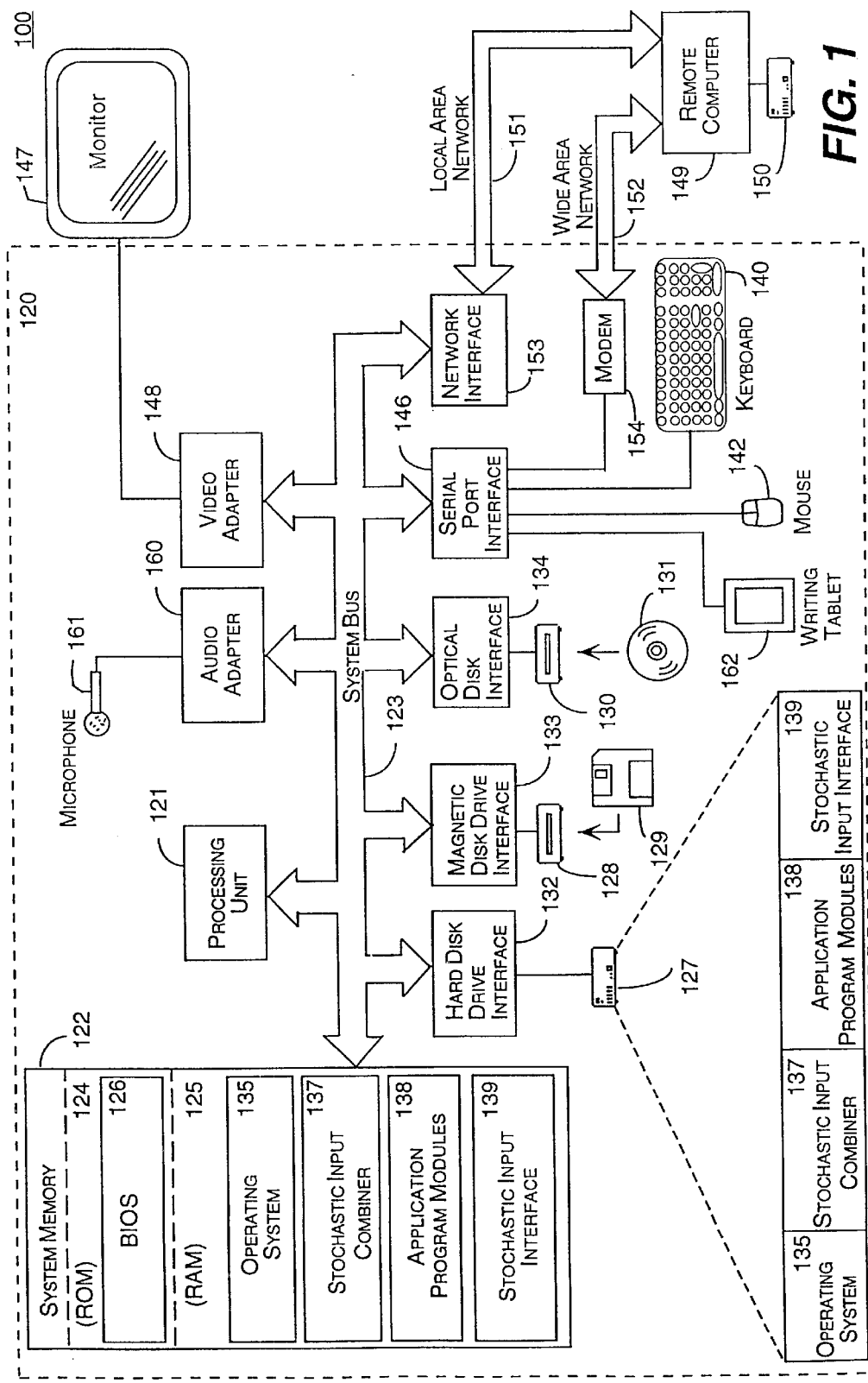
FIG. 1 is a functional block diagram of a personal computer system that provides the operating environment for the exemplary embodiments of the present invention.

FIG. 1 and the following discussion are intended to provide a brief, general description of suitable computing environment in which the present invention may be deployed. While the present invention will be described in the general context of an application-independent program that runs in conjunction with an operating system running on a personal computer, those skilled in the art will recognize that the present invention may be implemented within other program modules. Generally, program modules include routines, programs, components, data structures, etc. that perform particular tasks or implement a particular abstract data types. Moreover, those skilled in the art will appreciate that the present invention may be practiced with other computer system configurations, including hand-held devices, multiprocessor systems, microprocessor-based or programmable consumer electronics, mini computers, main frame computers, and the like. The present invention may also be practiced in distributed computing environments where tasks are performed by remote processing devices that are linked through a communications network. In a distributed computing environment, program modules may be located in remote memory storage devices.

Exemplary Operating Environment

FIG. 1 is a general description of a suitable computing environment 100 for an implementation of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable magnetic disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A user may enter commands and information into the personal computer 120 through conventional input devices, including a keyboard 140 and pointing device, such as a mouse 142. A microphone 161 may be used to enter audio input, such as speech, into the computer system 120. A user may enter graphical information, such as drawings or handwriting, into the computer system by drawing the graphical information on a writing tablet 162 using a stylus. The computer system 120 may include additional input devices (not shown), such as a joystick, game pad, satellite dish, scanner, or the like. The microphone 161 can be connected to the processing unit 121 through an audio adapter 160 that is coupled to the system bus. The other input devices are often connected to the processing unit 121 through a serial port interface 146 that is coupled to the system bus, but may be connected by other interfaces, such as a game port or a universal serial bus (USB).

A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as remote computer system 149 illustrated in FIG. 1. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the present invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120. Program modules control how the computer system 120 functions and interacts with the user, with I/O devices or with other computers. Program modules include routines, operating system 135, application program modules 138, data structures, browsers, and other software or firmware components. The present invention may conveniently be implemented in one or more program modules, such as a stochastic input combiner program module 137 and a stochastic input interface program module 139, each of which is based upon the methods described in the detailed description.

Figure 2:
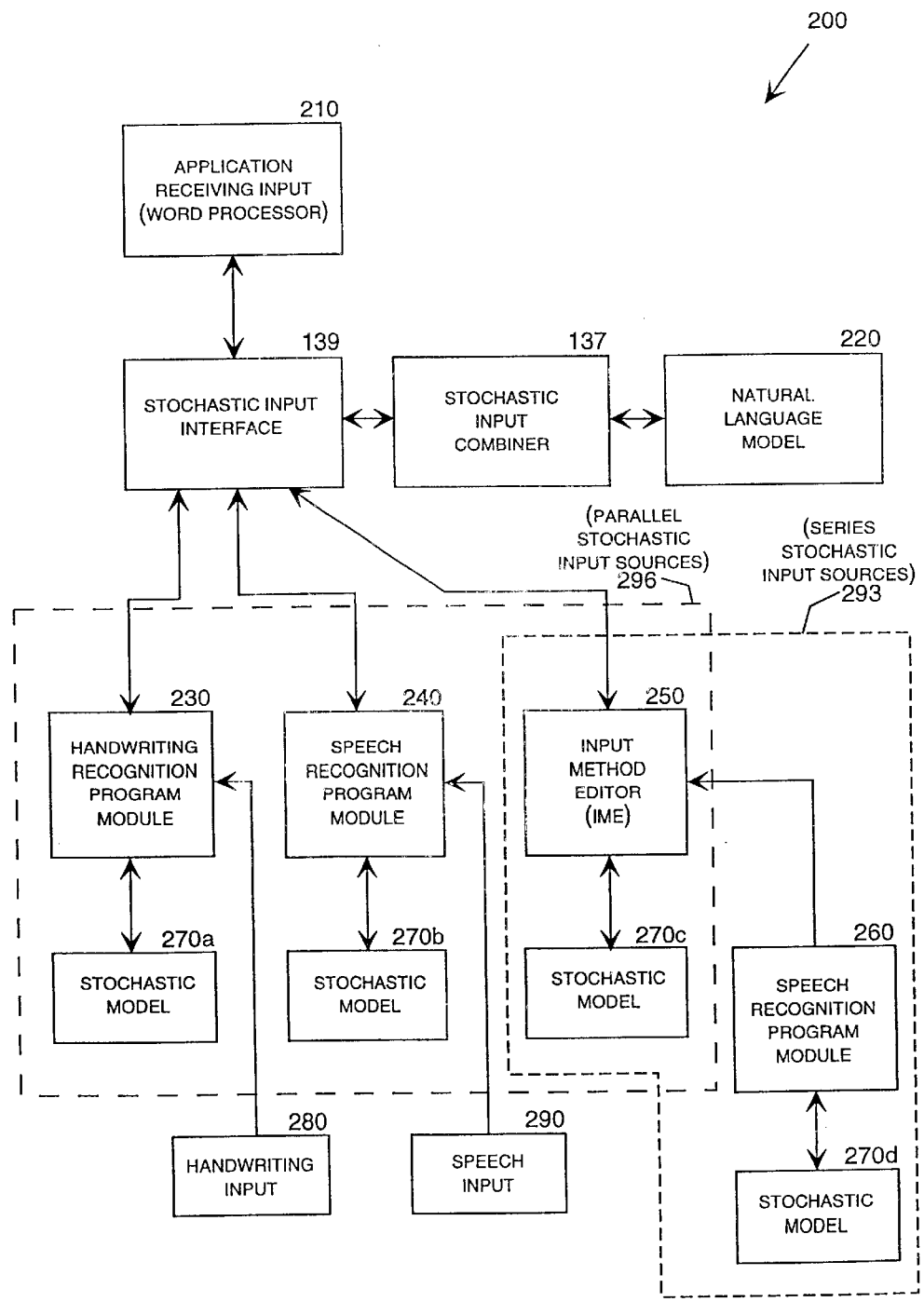
FIG. 2 is a functional block diagram of program modules of a multi-source data processing system.

The application program modules 138 may comprise a variety of applications used in conjunction with the present invention, some of which are shown in FIG. 2. The purposes of and interactions between some of these program modules are discussed more fully in the text describing FIG. 2. These include a word processor program 210 (such as WORD, produced by Microsoft Corporation of Redmond, Wash.), a handwriting recognition program module 230, a speech recognition program module 240, and an input method editor (IME) 250.

A particular programming language will not be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Overview of Program Modules

FIG. 2 provides an overview of the program modules of a multi-source data processing system 200. Generally, the purpose of the program modules shown in FIG. 2 is to produce stochastic data from user input and then use that stochastic result as text input to an application, such as a word processor. A stochastic result is one where alternatives are linked to probabilities. Also, a stochastic result generally means that there is more than one alternative. Stochastic data used as input into a program module is called "stochastic input." A program module that produces stochastic input for another program module is called a "stochastic input source."

The program modules shown in FIG. 2 enable a user to enter text into an application program such as a word processor 210 using both stochastic and non-stochastic input sources. Typical stochastic input sources include a handwriting recognition program module 230, speech recognition program module 240, input method editor (IME) 250, and speech recognition program module 260. A keyboard 140 is a typical source of non-stochastic data. Once the user enters text into the word processor 210 through one or more of these input sources, the user may then select a section of text and request a candidate list of alternatives for that text selection. The text selection may contain input from multiple stochastic and non-stochastic input sources. As long as the text selection is derived from at least one stochastic input source, there will be alternatives for the text selection. The program modules are enabled to produce this candidate list and present them to the user through a graphical user interface. If the user chooses one of the candidates, the text selection is replaced with the chosen candidate. The operation of stochastic input sources 230, 240, 250, and 260 are now discussed in turn.

The handwriting recognition program module 230 receives handwriting input 280 from the user. The user generates the handwriting input 280 by writing on the writing tablet 162 with a stylus. Alternatively (and not shown in the drawings), the user can generate handwriting by writing on a touchscreen with a stylus or using a pointing device such as a mouse to create text. After input, the handwriting input 280 is preferably directed to the handwriting recognition program module 230 by a writing tablet driver module in the operating system 135.

As handwriting is often difficult for a computer to interpret, the handwriting recognition program module 230 cannot always decipher the handwriting input 280 with complete accuracy. The best the program module 230 can do is to generate alternatives for the handwriting input 280 and assign a probability that each alternative is the correct one. By definition, then, the handwriting recognition program module 230 generates a stochastic result. The stochastic model 270a includes a data structure containing the stochastic data produced by processing handwriting input 280 with the handwriting recognition program module 230.

Although any data structure capable of storing stochastic data can comprise a stochastic model 270, two useful structures for doing so are a lattice and an "n-best" alternatives list. A lattice is a structure that is well known to those skilled in the art, so a complete description will not be given. Briefly, however, a lattice stores words or phrases produced by a stochastic input source in nodes. Because each word or phrase is stochastic data, the node also stores a probability assigned to the associated word or phrase. Using methods well known to those skilled in the art, the lattice can be traversed in order to produce likely alternatives for any section of text represented by the stochastic data. Furthermore, lattices representing adjacent pieces of text can be combined into a larger lattice through a process known as concatenation. The larger lattice can then be traversed to produce alternatives for the adjacent pieces of text.

Alternatively, stochastic data may be represented by a list of the n-best alternatives and their associated probabilities. For any given word or phrase, an n-best alternatives list may be produced from a lattice representing the word or phrase.

The speech recognition program module 240 works like the handwriting recognition program module 230, except that it receives speech input 290 from the user through a microphone 161 run by a microphone driver module in the operating system 135. Speech is often difficult to interpret because many words that sound alike have different meanings and spellings, so the speech recognition program module 240 also produces a stochastic result. The stochastic model 270b stores the data structure containing the stochastic data produced by processing speech input 290 with the speech recognition program module 240.

An input method editor (IME) 250 also generates stochastic data. Generally, an IME 250 converts: input in the form of a phonetic representation into sequences of ideographic characters. The input into an IME 250 may, for example, be typed text entered into the computer through a keyboard 140 and mouse 142. The stochastic model 270c includes a data structure containing the stochastic data produced by the IME 250.

An IME 250 is especially useful for creating ideograms in Asian and other languages. Because there are many more ideograms in such languages than there are keys on a keyboard, entering a particular ideogram into the computer is problematic without an IME 250. In a typical IME 250, a user types in English characters a phonetic spelling for a desired Chinese character. Since many Chinese characters have similar pronunciations, the typed phonetic spellings may represent any one of a number of different Chinese characters, and the IME 250 produces a stochastic result. The IME 250 then provides the user with the most probable candidates intended by the typed phonetic spelling so that the user can choose the correct one.

The stochastic results produced by one stochastic input source may serve as stochastic input to a second stochastic input source. When this is the case, the stochastic input sources are "series stochastic input sources," and the stochastic input sources can be described as configured "in series." This is illustrated by the configuration 293 of program modules, which also demonstrates another embodiment of an IME 250.

In this embodiment, English speech may be entered into the computer and used to produce Japanese text. The speech is first submitted to a speech recognition program module 260. In operation, the speech recognition program module 260 functions much like the speech recognition program module 240, but it is illustrated as a distinct unit because it may have a different speech interpretation engine. For example, the speech recognition program module 260 may interpret a different language than the speech recognition program module 240. The stochastic model 270d includes a data structure containing the stochastic data produced by processing speech input with the speech recognition program module 260.

In an English speech/Japanese IME example, the speech recognition program module 260 may produce English text alternatives from the spoken English words and store them: in the stochastic model 270d. One or more of the English language text alternatives stored in the stochastic model 270d can then be used as input into the IME 250, which translates the English language text input into Japanese characters. Each alternative input into the IME 250 produces a separate stochastic result, though it should be appreciated that there may be overlap between the alternatives forming the stochastic results of two distinct inputs into the IME 250.

Though the arrow in FIG. 2 from the speech recognition program module 260 to IME 250 illustrates that the speech recognition program module is a stochastic input source for the IME 250, it should be understood that the two program modules may not interface directly. Thus, for example, stochastic input from speech recognition program module 260 to IME 250 may travel through an interface program module, such as stochastic input interface 139, to which each stochastic input source is directly connected.

A stochastic input interface 139 serves as a conduit for stochastic data between an application 210 that is to receive stochastic data and a stochastic input source, such as handwriting recognition program module 230, speech recognition program module 240, or IME 250. One advantage of having a stochastic input interface 139 as a conduit for stochastic data is that it simplifies communication between the application 210 receiving the stochastic data and the stochastic input sources. That is, the application only needs to know how to communicate with the stochastic input interface instead of all possible stochastic input sources. In an exemplary embodiment of the present invention, the application program 210 that is to receive stochastic input is a word processor. However, the application 210 could also be a spreadsheet, browser, electronic mail program, music transcription program, CAD program, or operating system.

In the word processor embodiment, the word processor 210 receives, though stochastic input interface 139, text representing the most likely alternative from each stochastic input source used to enter data into the word processor. In addition to transmitting data into the word processor 210 through multiple stochastic input sources, the user may also enter typical non-stochastic data into the word processor, such as by typing on a keyboard 140. The word processor 210 combines all this source data into a multi-source text string that is presented to the user. Although the word processor 210 does not indicate to the user the source of each word of the text, the word processor nonetheless maintains a record of the source of each component of the text.

The word processor 210 is also functional for allowing the user to select a section of text and to request alternatives for that selection. If the text selection is derived from one or more stochastic input sources, there will be alternatives for the text selection. The word processor 210 can request a candidate list of alternatives from the stochastic input interface 139 by providing it with the text selection and the sources of each of the components of that text selection. After the request is processed, the stochastic input interface 139 provides the word processor 210 with a candidate list for the entire text selection. The word processor 210 provides the candidate list to the user through a graphical user interface. If the user chooses one of the alternatives for the text selection from the candidate list, then the word processor replaces the text selection with the chosen candidate.

In order to process the request for a candidate list of alternatives for a text selection, the stochastic input interface 139 transmits the request to the stochastic input combiner 137. By communicating with the stochastic input sources through the stochastic input interface 139, the stochastic input combiner 137 can retrieve information about the stochastic models 270 needed to produce the candidate list for the text selection. In combining stochastic models 270 to produce the candidate list, the stochastic input combiner 137 may optionally consult a natural language model 220, which uses clues such as grammar and the overall meaning of a section of text in order to produce additional alternatives for the candidate list and to reevaluate the probabilities of those alternatives derived by combining the stochastic models 270. The methods used to produce a candidate list of alternatives for a text selection will be elucidated in conjunction with the text describing FIGS. 3–9.

As shown in FIG. 2, stochastic input sources 230, 240, and 250 can each provide stochastic data to word processor 210 without first filtering their stochastic data through another stochastic input source. In other words, stochastic input sources 230, 240, and 250 can each directly (through stochastic input interface 139) transmit stochastic data to the word processor 210, and stochastic data from each source can be incorporated into the same word processing document. For this reason, they are "parallel stochastic input sources" 296, and these stochastic input sources may be described as configured "in parallel."

Although the various program modules have been described separately, one skilled in the art should recognize that the modules could be combined in various ways and that new program modules could be created to accomplish similar results. In particular, the stochastic input combiner 137 and the natural language model 220 could reside in the stochastic input interface 139, and all three program modules could be part of the operating system 135 or the word processor 210. Similarly, the stochastic input sources 230, 240, 250, and 260 could be stand-alone application program modules 138, or they could be part of the operating system 135.

Overview of Background Audio Recovery System

Figure 3:
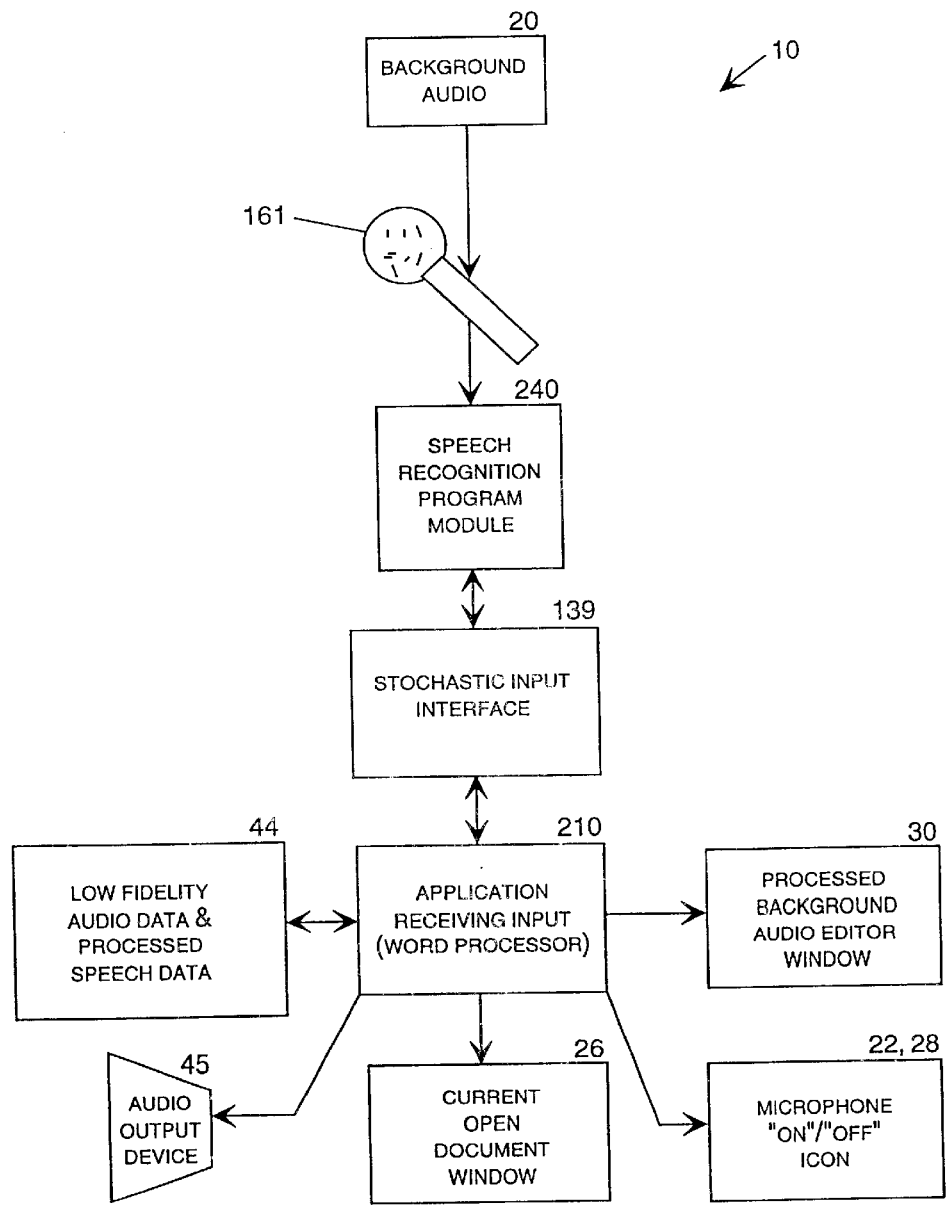
FIG. 3 is a functional block diagram of the background audio recovery system of the present invention.

FIG. 3 is a block diagram illustrating the background audio recovery system 10 of the present invention. The background audio recovery system 10 receives background audio 20 through a microphone 161. The speech recognition program module 240 of the background audio recovery system 10 stores the background audio. The stochastic input interface 139 passes messages, commands, or communication between the application 210 and the speech recognition program module 240. In the exemplary embodiment of the present invention, the application 210 is a word processor. However, the application 210 could also be a spreadsheet, browser, electronic mail program, music transcription program, a CAD program, an operating system, or other like applications.

Figure 6:
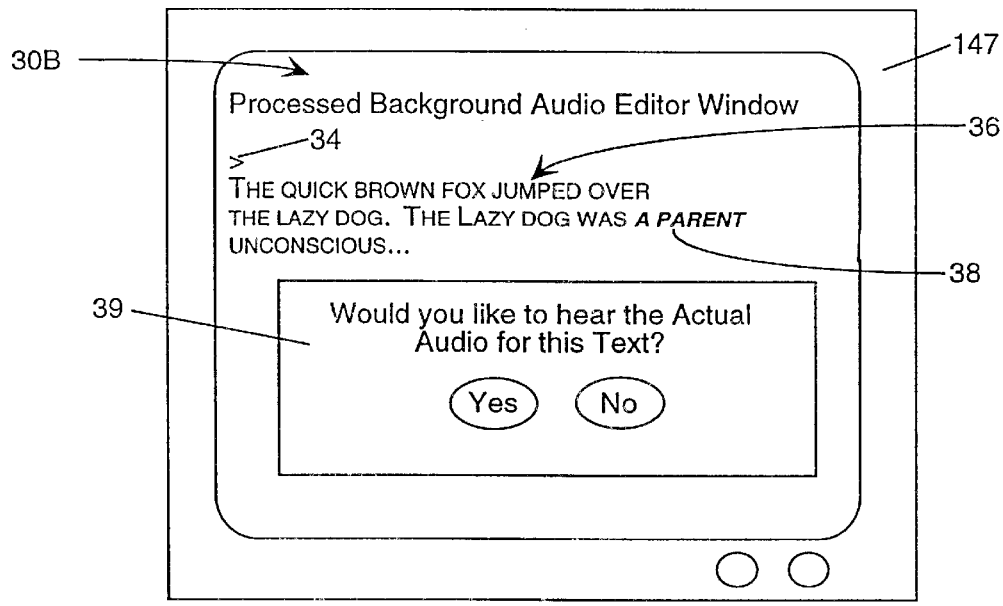
FIG. 6 is a graphical user interface editor window for the background audio recovery system where spoken commands have been applied to the background audio.
Figure 7:
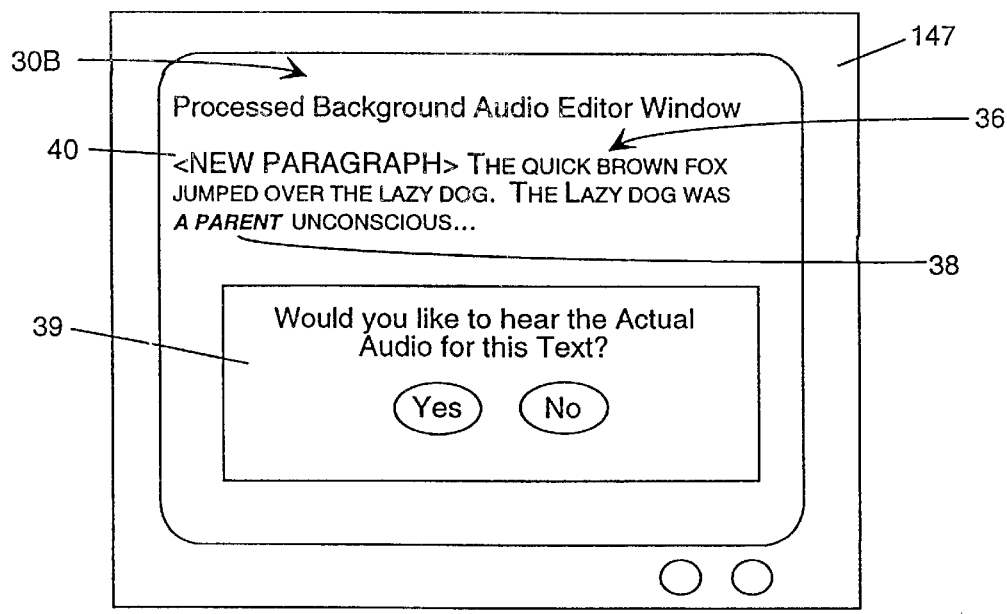
FIG. 7 is a graphical user interface editor window for the background audio recovery system where spoken commands have been displayed as text.
Figure 8:
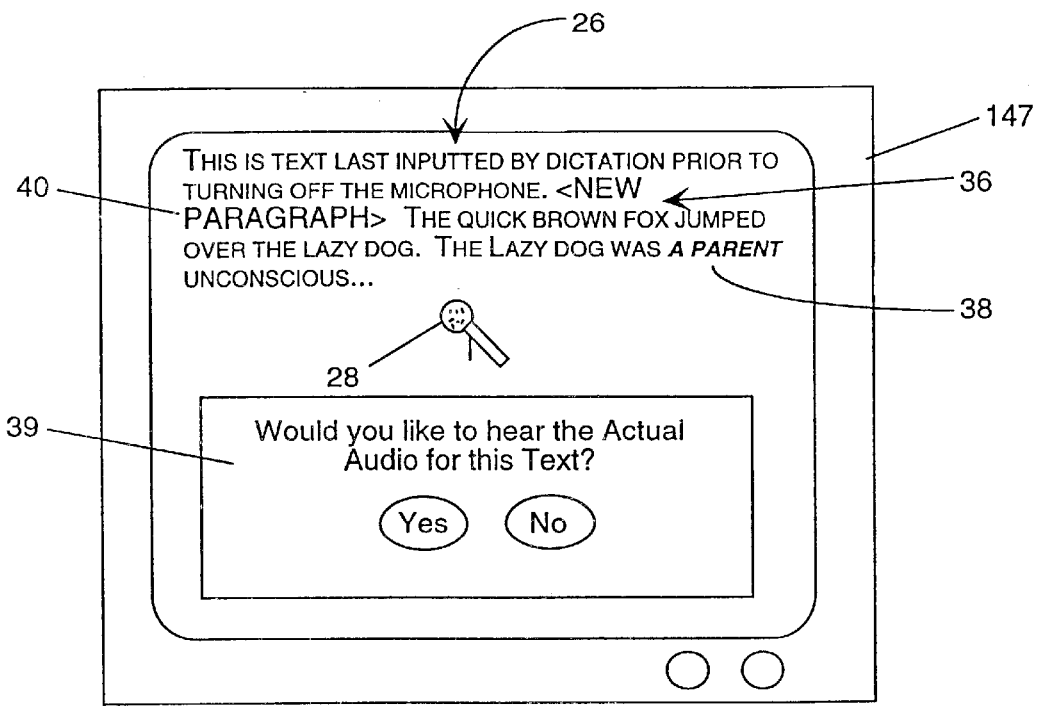
FIG. 8 is a graphical user interface for the background audio recovery system where spoken commands have been displayed as text and the background audio has been inserted into an open document of a word processor type application program.

The application 210 is responsible for tracking the storage of the background audio 20 as files 44 containing low fidelity audio data and the processed speech data or text data 36 (as illustrated in FIGS. 6–8). The application program 210 is operatively linked to the a graphical user interface 30 (in the form of a background audio editor window). The application 210 is responsible for generating and maintaining the current open document window 26. The application 210 is further responsible for producing status indicators 22, 28. The application 210 is also operatively linked to an audio output device 45. The audio output device 45 is preferably a speaker of a personal computer. However, other audio output devices 45 are not beyond the scope of the present invention. Other audio output devices may include, but are not limited to, external mounted speakers, headphones, and other like audio output devices.

Generation of Background Audio

Figure 4:
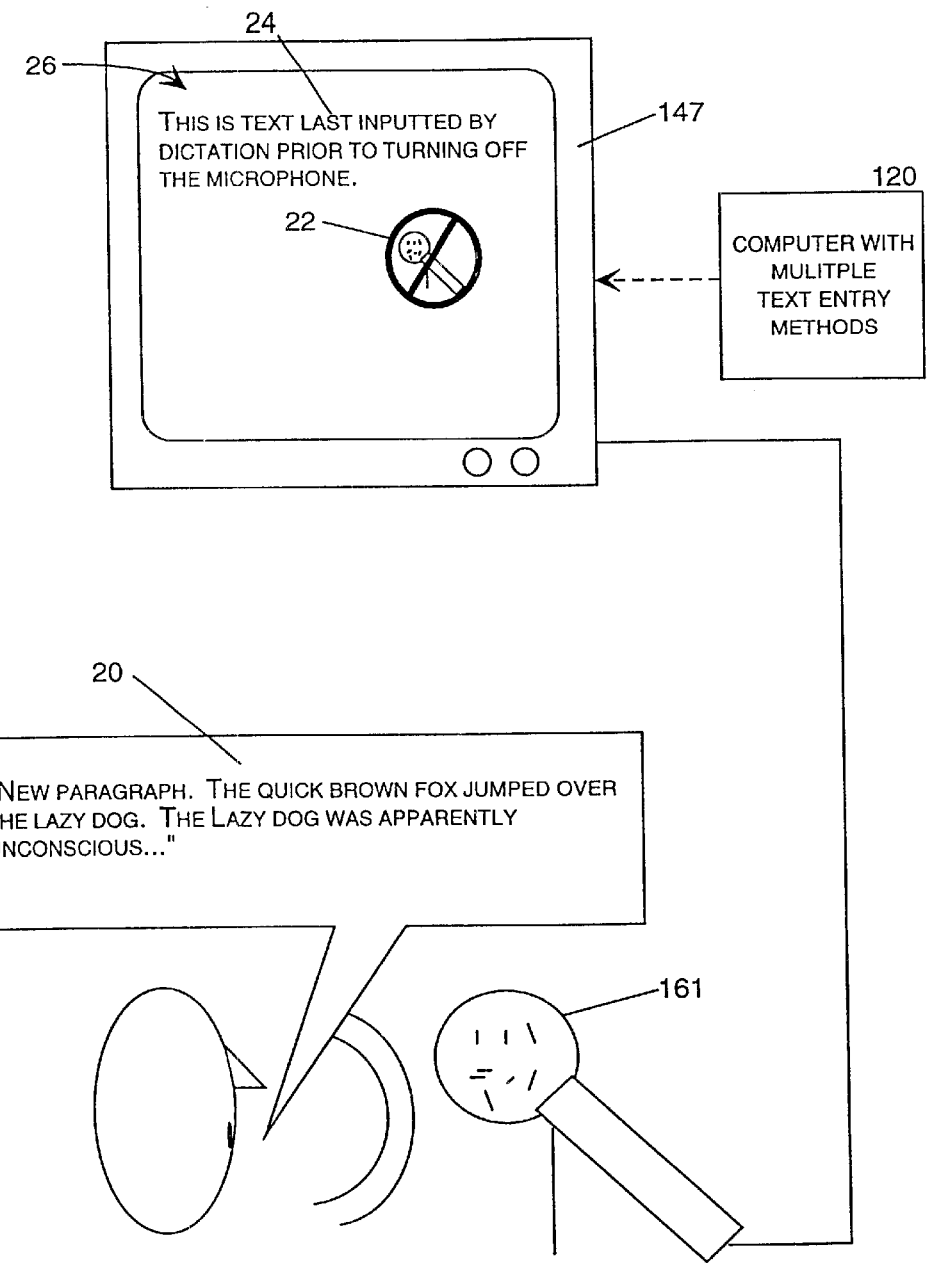
FIG. 4 illustrates a graphical user interface and a microphone for the background audio recovery system of the present invention.

FIG. 4 illustrates the generation of background audio 20 for the background audio recovery system 10 on the present invention. The situation in FIG. 4 is representative of at least one of the following scenarios: the user does not remember that the speech recognition program module 240 has been assigned to an inactive state; the user does not notice the inactive status indicator 22 displayed on the monitor 147; the user does not properly recite the spoken command to activate the speech recognition program module 240; the user does not properly key-in the activation command via the keyboard 140 for the speech recognition program module 240; or the user does not activate a dedicated switch on the microphone 161; or the user does not select a button on the GUI with the mouse 142 to activate the microphone 161. The background audio 20 includes the spoken command "New Paragraph" in addition to the following dictation: "The quick brown fox jumped over the lazy dog. The lazy dog was apparently unconscious."

Previously processed speech 24 is present within a current open document 26 of the application program 210 receiving input. Since the speech recognition program module 240 has been assigned to an inactive state as indicated by the inactive status indicator 22 on the monitor 147, speech data within the background audio 20 being stored by the background audio recovery system 10 of the present invention is not converted and therefore, it is not displayed in the open document 26 of the word processor application 210. While the inactive status indicator 22 informs a user that the speech recognition program module has been assigned to an inactive state, the background audio recovery system 10 continuously monitors the microphone 161 for any background audio 20 and records such audio if detected.

Activation of Background Audio Program Module

Figure 5:
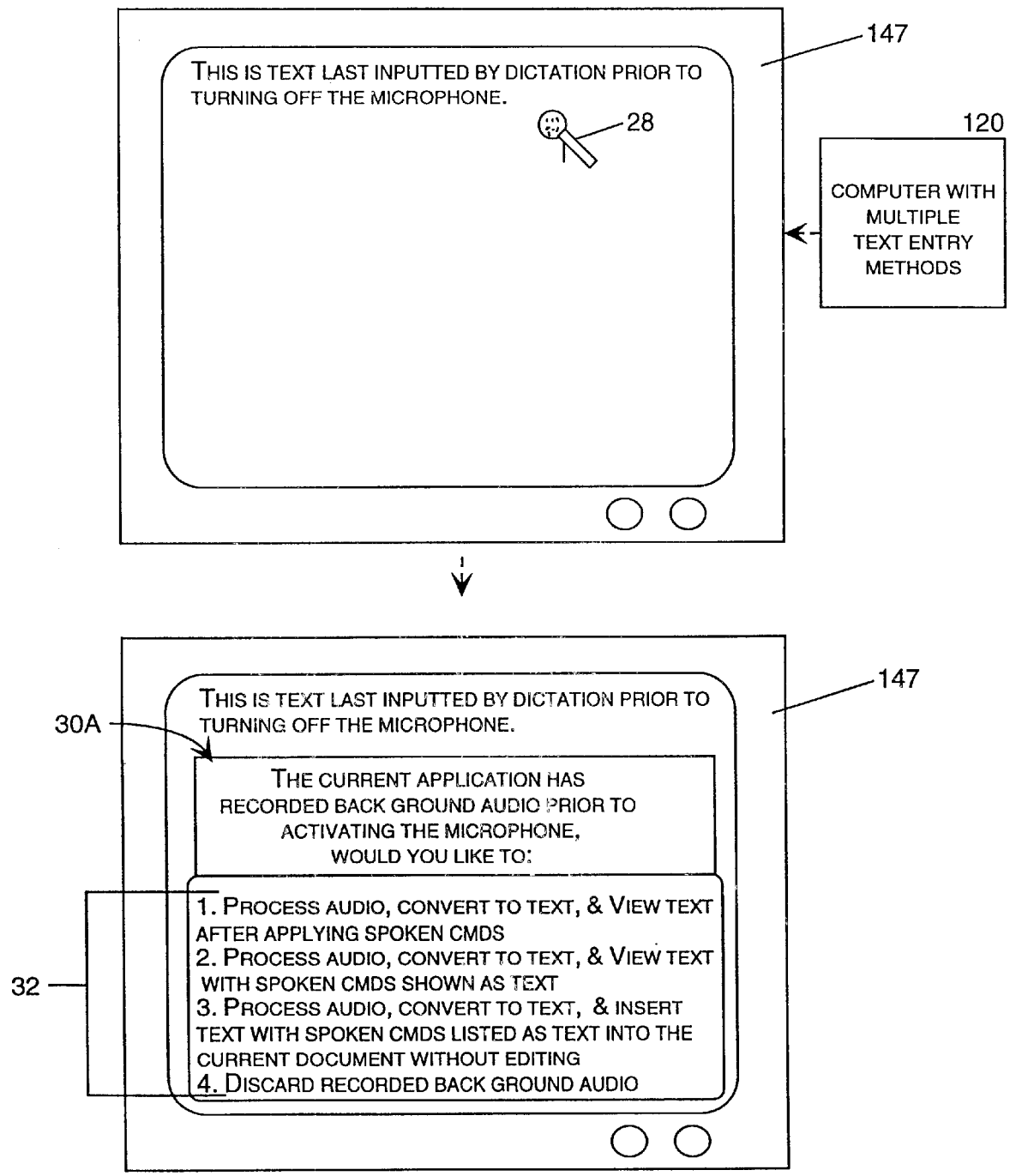
FIG. 5 illustrates a graphical user interface for the background audio recovery system after a speech recognition program module of the background audio recovery system has been activated or "turned on".

FIG. 5 illustrates the activation or initiation of a background audio program module of the background audio recovery system of the present invention. In FIG. 5, an active status indicator 28 is displayed as a result of the background audio recovery system receiving a command for activating the speech recognition program module 240. In the lower part of FIG. 5, subsequent to the active status indicator 28 being displayed, the background audio recovery system of the present invention generates a graphical user interface 30A that includes a list of options 32 for the stored audio data that was recorded by the background audio recovery system 10.

FIG. 6 illustrates the graphical user interface 30B after the user has selected option number one of the list of options 32: process the background audio, convert speech data within the background audio to text data, and view the converted text data with recorded spoken commands being applied to the processed background audio or speech. In FIG. 6, the spoken command "New Paragraph" within the background audio 20 is illustrated by the carriage return symbol 34. The converted text data 36 includes an incorrectly processed word/phrase 38 that is a result of a phonetically similar substitution made by the speech recognition program module 240. Also in FIG. 6, the user is prompted with a playback command option window 39 where the user has the option to listen to the actual audio for the processed speech.

FIG. 7 illustrates the graphical user interface 30B after the user has selected option number two of the list of options 32: process the background audio 20, convert speech data within the background audio 20 to text data, and view the converted text data with the previously spoken commands shown as text. The converted text data 36 includes a command 40 shown in an upper case font surrounded by leading and ending graphical characters. The text data 36 further includes the improperly/inaccurate processed word/phrase 38. The graphical user interface 30 of FIG. 7 further includes the playback command option window 39 that prompts a user to listen to the actual audio for the corresponding text data 36.

The playback of the actual audio for the text data 36 provides a useful editing tool for correcting inaccurate phonetically substituted words 38. For example, during the playback of the actual audio for the text 36 illustrated in FIG. 7, the user will notice that the inaccurate/improperly processed word/phrase 38 "a parent" should read as "apparently". The playback of actual audio capability ensures that the text data 36 is an accurate conversion or transcript of the background audio 20.

FIG. 8 illustrates the placement of text data 36 in an open document 26 of an application program 210. FIG. 8 is a result of a user selecting option number three of the list of options 32 shown in FIG. 5. Option three includes the processing of the background audio 20, converting speech data within the background audio 20 to text, and inserting the converted text with spoken commands shown as text into the current open document without editing. The "New Paragraph" command 40 is shown in capital letters with beginning and trailing graphical markers. FIG. 8 also illustrates how the text data 36 becomes part of the text of the open document 26. The active status indicator 28 is also illustrated in the open document 26 to indicate that speech recognition program module 240 is ready to receive speech audio.

Figure 9:
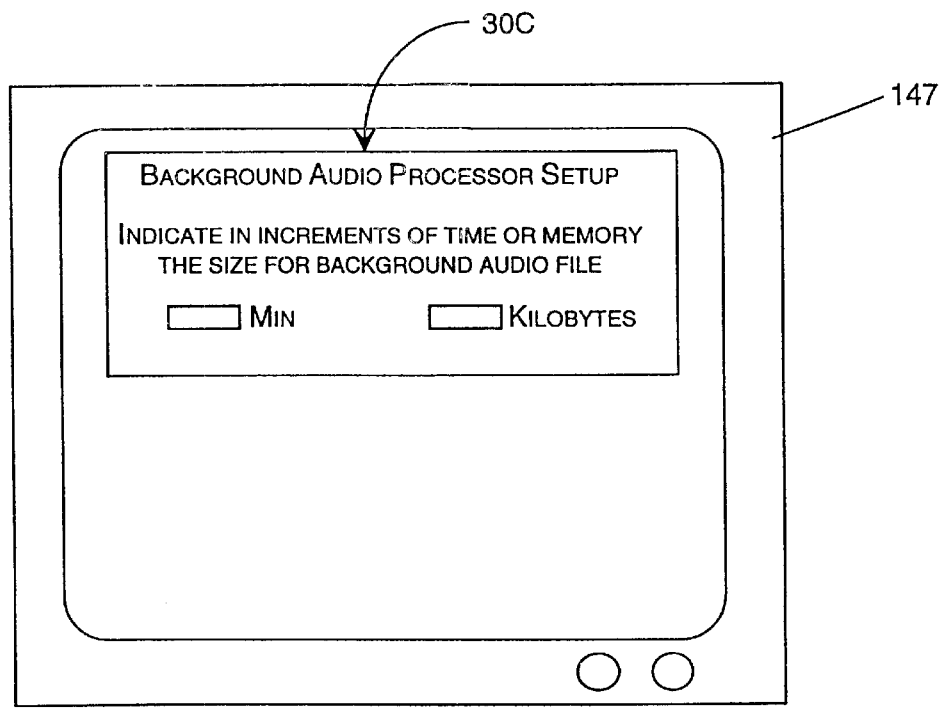
FIG. 9 illustrates a graphical user interface set up menu for the background audio recovery system of the present invention.

FIG. 9 illustrates a graphical user interface 30C for the setup feature of the background audio recovery system 10. The user may enter a time increment/value or memory amount/value into the graphical user interface 30C by using either a keyboard 140 or by a spoken command inputted through microphone 161 or mouse 142 or other input method. The second graphical user interface 30C prompts the user to enter the size of the background audio file in either units of time or memory space allocation. In the embodiment illustrated in FIG. 9, the time increment is illustrated in the units of minutes and the size of the memory allocation is illustrated in kilobytes. However, other units are not beyond the scope of the present invention. Other units of time include hours, thousands of seconds, etc. Other units of memory allocation include megabytes, gigabytes, and other like parameters.

Exemplary Memory Storage Devices

Figure 10:
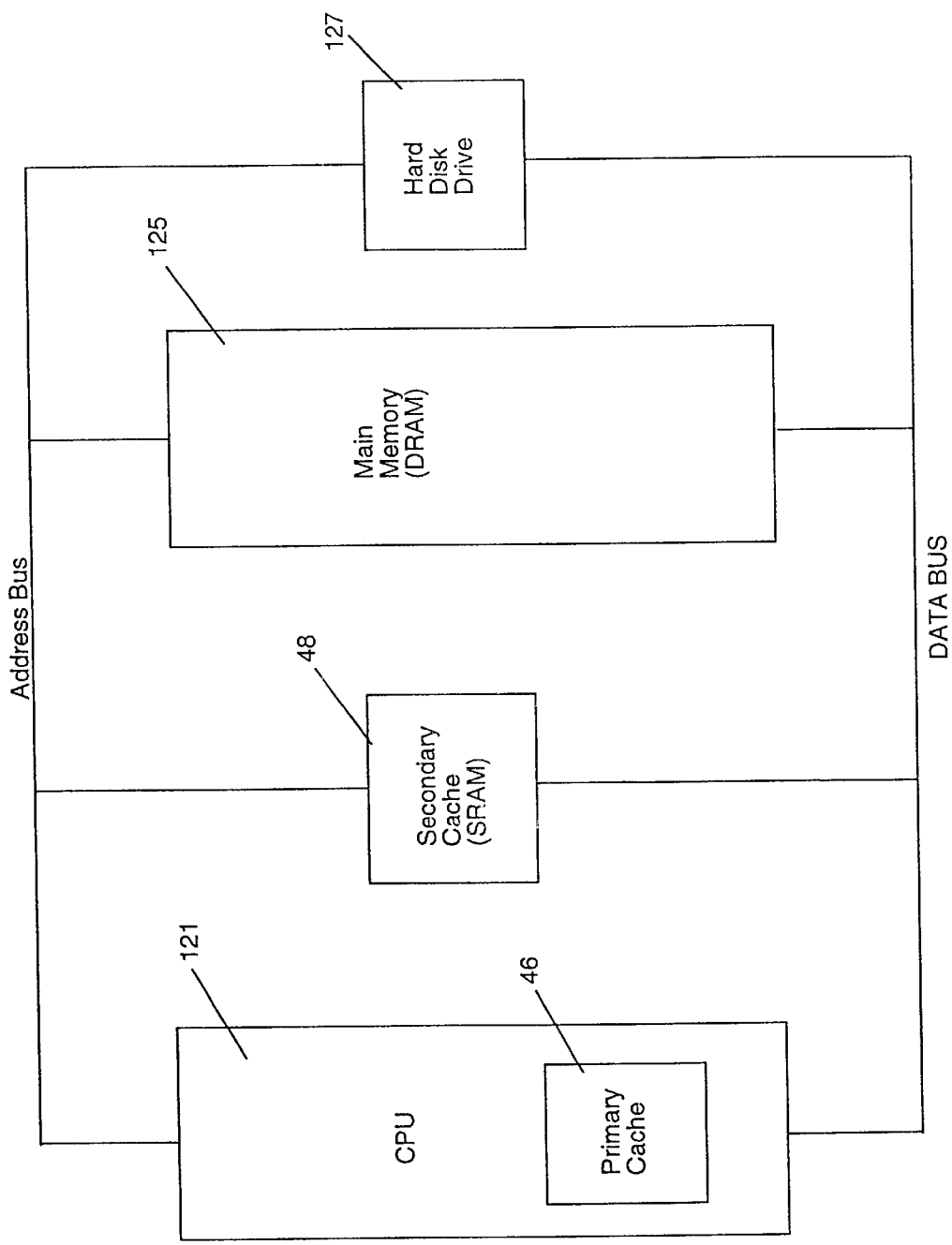
FIG. 10 is a functional block diagram of memory devices for the background audio recovery system of the present invention.

FIG. 10 is a block diagram illustrating the central processing unit 121 and its various memory devices. In a preferred embodiment, the text data 36 and background audio 20 are stored in a primary memory device 46 and secondary memory device 48. The primary memory device 46 is preferably a cache memory, which is fabricated directly on the central processing unit chip 121. The secondary memory device 48 is preferably a secondary cache in the form of static random access memory (SRAM). One advantage of the primary memory device 46 and secondary memory device 48 is that each provides high speed access relative to main memory 125 and the hard disk drive 127. The present invention is not limited to utilizing only the primary memory device 46 and secondary memory device 48. The background audio recovery system 10 may also employ main memory 125 and the hard disk drive 127 or combinations thereof to store the background audio 20 and related text data 36.

Operation of Background Audio Recovery System

Figure 11:
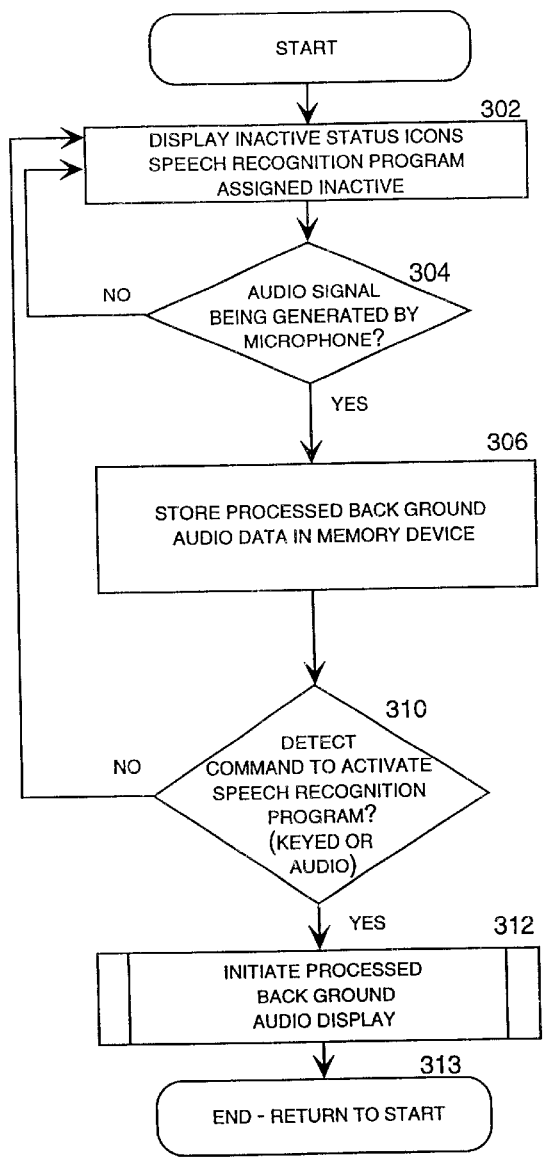
FIG. 11 is a logic flow diagram illustrating the operation of the background audio recovery system of the present invention.

FIG. 11 is a logic flow diagram illustrating a routine 300 for operating the background audio recovery system 10. Throughout the following description of routine 300, reference will occasionally be made to the graphical user interfaces 30A–C shown in FIGS. 5–9. The background audio recovery system 10 continuously monitors the microphone 161 when the speech recognition program module 240 has been assigned to an inactive mode. In step 302, the application 210 displays the inactive status indicator 22 while the speech recognition program module 240 has been assigned to an inactive mode. The background audio recovery system 10 continuously monitors the microphone 161 to determine whether an audio signal is being generated by the audio input device or microphone 161 as illustrated in step 304. If no audio signal is generated by the microphone 161, the "no" branch is followed back to step 302. If an audio signal is generated by the microphone 161, the "yes" branch is followed to step 306.

In step 306, the speech recognition program module 240 stores the audio signal in a memory device. Alternatively, to reduce memory storage requirements, the speech recognition program module can convert speech data within the background audio 20 immediately into text data 36. The text data 36 could then be stored in the primary memory device 46 while the actual background audio 20 is stored as a low fidelity audio file in either the secondary memory device 48 or hard disk drive 127. However, in the preferred embodiment, the speech recognition program module 240 stores the background audio 20 for later conversion.

In step 310, the background audio recovery system 10 determines whether a command for activating the speech recognition program module 240 has been issued. The background audio recovery system 10 monitors any keyboard entry of the command or spoken command processed by the speech recognition program module 240. If the background audio recovery system 10 does not detect a command to activate the speech recognition program module 240, then the "no" branch is followed back to step 302. If the command to activate speech recognition program module 240 is detected, then the "yes" branch is followed to routine 312.

Routine 312 for the background audio recovery system 10 is described in further detail with reference to FIG. 13. During routine 312, the background audio recovery system 10 changes the inactive status indicator 22 to the active status indicator 28 and then generates graphical user interface 30A as illustrated in FIG. 5.

Routine 312 is followed by step 313. For step 313, the user assigns the speech recognition program module 240 to an active mode or to an inactive mode. If the user assigns the speech recognition program module 240 to an inactive mode, the process returns to step 302.

Figure 12:
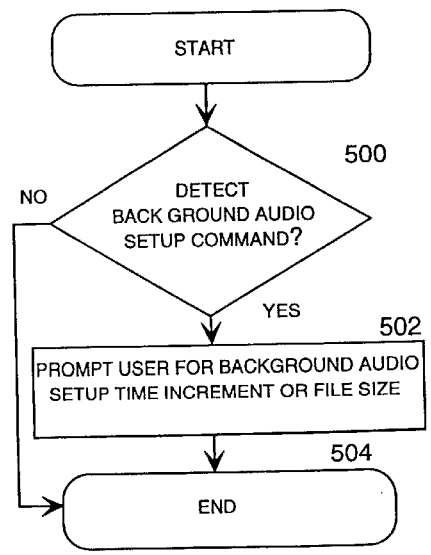
FIG. 12 is a logic flow diagram illustrating a set up feature of the background audio recovery system of the present invention.

FIG. 12 is a logic flow diagram illustrating a routine 500 for a setup operation of the background audio recovery system 10 (as illustrated in FIG. 9). In step 500, the background audio recovery system 10 detects whether a background audio setup command has been issued by the user. If a setup command has not been issued by the user, the "no" branch is followed to the "End" step 504. If a background audio setup command is issued by the user, the "yes" branch is followed to step 502, in which the background audio recovery system 10 generates the graphical user interface 30C as illustrated in FIG. 9. In step 502, the user is prompted for a set up time increment or file size increment of the background audio file. As noted above, the user can select the size of the background audio file according to either a time increment or memory size increment. The user can also be prompted by the system to select the size of the file that will later contain the converted text.

Figure 13:
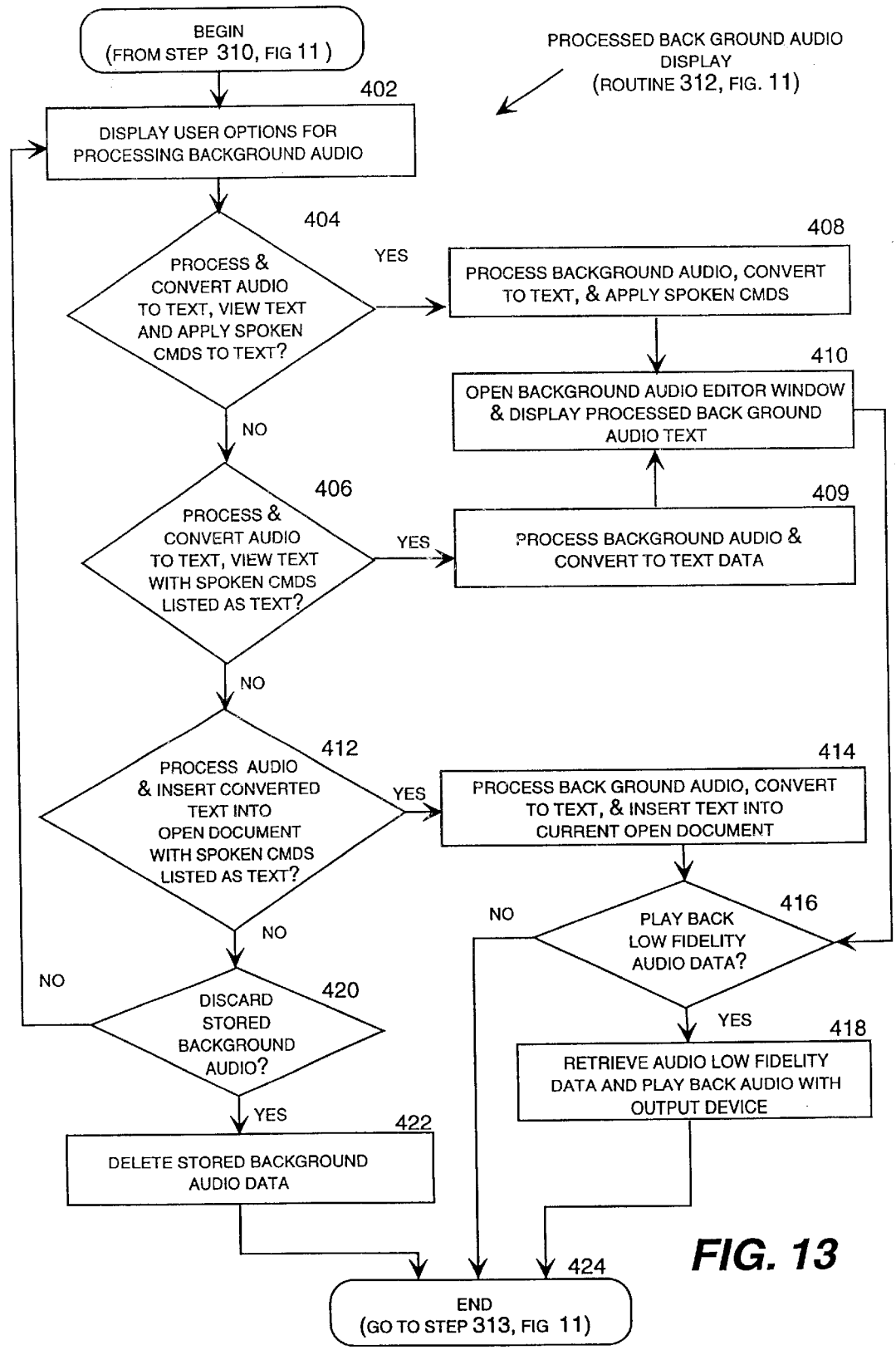
FIG. 13 is a logic flow diagram illustrating the details of the menu for the background audio display of the present invention.

FIG. 13 is a logic flow diagram illustrating routine 312 for the background audio recovery system 10. Routine 312 begins after step 310, shown in FIG. 11. In step 402, the background audio recovery system 10 displays a list of options 32 according to the graphical user interface 30A illustrated in FIG. 5. The list of options 32 pertains to the stored background audio data 20 recorded by the speech recognition program module 240 during the inactive mode.

Step 402 is followed by step 404 in which the background audio recovery system 10 determines whether the user desires to process and convert speech data within the audio to text data 36 and then view the text data 36 after applying any spoken commands to the text data 36. If the user does not indicate to process the background audio 20, the "no" branch is followed to step 406. If the user does indicate to process the background audio, the "yes" branch is followed to step 408.

In step 408, the speech recognition program module 240 processes the recorded background audio 20 and applies any spoken commands to the remaining audio to be converted and converts speech data within the audio 20 to text data 36. Step 408 is followed by step 410 where the background audio recovery system 10 generates graphical user interface 30B and displays the converted text data 36 as illustrated in FIG. 6.

In step 406, if the user indicates to process the background audio 20 and convert speech data within the audio to text data 36 without applying spoken commands but displaying the commands as text, the "yes" branch is followed to step 409. In step 409, the background audio recovery system 10 processes the background audio and converts the speech data within the audio (including commands) into text data 36. Step 409 is then followed by step 410 in which the background audio recovery system 10 generates the graphical user interface 30B and displays converted text data 36 as illustrated in FIG. 7.

Step 410 is followed by step 416 in which the background audio recovery system 10 prompts the user with the playback command option window 39 as illustrated in FIGS. 6–8. Playback command option window 39 queries whether the user wants to playback the actual audio low fidelity file data to enhance the editing process of the text data 36. If the user does not want to listen to the actual audio low fidelity file data, the "No" branch is followed to step 424, which returns the process to step 313 on FIG. 11. If the user desires to listen to the actual audio low fidelity file data, the "Yes" branch is followed to step 418.

In step 418, the background audio recovery system retrieves the actual audio low fidelity file and plays back the actual audio through the audio output device 45 as illustrated in FIG. 3. Such playback of the actual audio low fidelity files enhances the editing process of the text data 36 where the user will recognize that the inaccurate/improperly processed word 38 "a parent" should be changed to "apparently" to directly correspond with the original background audio 20.

In step 412, the background audio recovery system 10 determines whether the user desires to process the background audio 20 and convert speech data within the audio (including commands) into text data 36, and insert the text data 36 directly into the current open document 26 of the application program 210 without any editing. If the user election is negative, then the "No" branch is followed to step 420. If the user election is positive, then the "Yes" branch is followed to step 414.

In step 414, the background audio recovery system 10 processes the background audio 20, and converts speech data within the audio (including commands) into text data 36. The background audio recovery system 10 then inserts this text data 36 into the current open document 26 as illustrated in FIG. 8. In the alternative, the background audio recovery system 10 at this stage could also apply spoken commands to the recorded audio 20 if desired by a user. Step 414 is followed by step 416. In step 416, the playback command option window 39 is displayed and the background audio recovery system 10 waits for user input as described above.

In step 420, the background audio recovery system 10 determines whether the user desires to discard the recorded background audio 20. If the user does not want to discard the background audio 20, the "no" branch is followed back to step 402. If the user does desire to discard the recorded background audio 20, then the "yes" branch is followed to step 422.

In step 422, the background audio recovery system 10 deletes the recorded background audio 20 from the primary memory device 46 and erases any actual audio low fidelity data from a corresponding memory device. Step 422 is then followed by step 424 in which the process returns to step 313 of FIG. 11.

The background audio recovery system 10 may include additional functionality: For example, if the user desires to view the text data 36 and apply the spoken commands contained therein one command at a time, the background audio recovery system 10 can prompt the user as to whether or not the user would like a command to be applied to a particular portion of text data. In other words, after each detected command, the user can decide whether or not to apply the command to the appropriate portion of the text data 36.

The background audio recovery system 10 may further provide enhanced playback capabilities where actual background audio is played back sentence by sentence, or paragraph by paragraph, or according to a specific portion of text data 36 selected by the user. Such an enhanced playback capability would prompt the user after each playback as to whether or not the user would like to listen again to the selected portion of text data 36. Other enhanced playback capabilities would include the use of a voice synthesizer for text that was keyed-in by a user or text entered by other means.

Many other modifications and additional features will become evident in view of the proceeding description of the exemplary embodiments of the present invention. It should be understood, therefore, that the foregoing relates only to the exemplary embodiments of the present invention, and that numerous changes may be made therein without departing from the spirit and scope of the present invention as defined by the following claims.

What is claimed is:

1. A computer-readable medium on which is stored a program module, the program module comprising instructions which, when executed by a computer, performs the steps of:

displaying an inactive status indicator for a speech recognition program module in an application program;

determining whether an audio input device is receiving audio;

if audio is being received by the audio input device, storing the audio;

determining whether a command for activating the speech recognition program module has been issued; and if the command for activating the speech recognition program module has been issued, initiating a background audio program module for manipulating the stored audio data.

2. The computer-readable medium of claim 1, wherein the step of storing audio data includes storing the audio data in a memory device.

3. The computer-readable medium of claim 2, wherein said memory device includes a cache memory of a central processing unit.

4. The computer-readable medium of claim 2, wherein said memory device includes a re-writable memory device.

5. The computer-readable medium of claim 2, wherein said memory device includes at least one of random access memory and a hard disk.

6. The computer-readable medium of claim 1, wherein the step of determining whether an audio input device is generating an audio signal includes the step of determining whether a microphone is detecting voice data.

7. The computer-readable medium of claim 1, wherein the application program includes a word processing program.

8. The computer-readable medium of claim 1, wherein the step of displaying an inactive status indicator for an application program includes displaying an inactive status icon on a display device.

9. The computer-readable medium of claim 1, wherein the step of determining whether a command for activating the application program has been issued includes the step of detecting the command from a command input device.

10. The computer-readable medium of claim 9, wherein said command input device includes at least one of the audio input device, a keyboard interface, a mouse, and a touchscreen.

11. The computer-readable medium of claim 1, wherein the step of initiating a background audio program module for manipulating the text data includes the steps of:

displaying a graphical user interface on a display device; and displaying a list of options for the audio data within the graphical user interface.

12. The computer-readable medium of claim 1, wherein the stored audio data comprises stored speech data, and wherein the step of initiating a background audio program module for manipulating the audio data includes the step of converting the stored speech data into text data and displaying the text data on a display device, the text data including textual application program commands displayed as graphical characters.

13. The computer-readable medium of claim 1, wherein the stored audio data comprises stored speech data, and wherein the step of initiating a background audio program module for manipulating the audio data includes the steps of:

converting the stored speech data into text data;

applying text commands present in the stored speech data after converting a portion of the stored speech data; and displaying the text data on a display device.

14. The computer-readable medium of claim 1, wherein the stored audio data comprises stored speech data, and wherein the step of initiating a background audio program module for manipulating the audio data includes the steps of:

converting the stored speech data into text data; and inserting the text data into an opened file being accessed by the application program, the text data including textual application program commands displayed as graphical characters.

15. The computer-readable medium of claim 1, wherein the step of initiating a background audio program module for manipulating the audio data includes the steps of deleting the stored audio data from a memory device.

16. The computer-readable medium of claim 1, further comprising the step of storing the audio data as a sound file in a memory device.

17. The computer-readable medium of claim 16, further comprising the steps of:

converting the stored audio data into text data;

displaying the text data on a display device; and outputting the audio data as sound from a sound file of the memory device.

18. The computer-readable medium of claim 1, further comprising the step of:

obtaining at least one of a time increment and a file size increment, said time increment and said file size increment corresponding to a size of an audio file.

19. The computer-readable medium of claim 1, further comprising the step of:

obtaining at least one of a time increment and a file size increment, said time increment and said file size increment corresponding to a size of a text file containing at least one of text data and textual application program commands.

20. A background audio recovery system comprising:

a processor;

a first memory storage device for storing an application program and a speech recognition program module;

a display device coupled to said processor for displaying information;

an input device coupled to said processor for manipulating a selection indicator displayed on the display device; and an audio input device coupled to said processor; said processor, responsive to instructions from the application program module and speech recognition program module, being operative to:

displaying an inactive status indicator on said display device for said speech recognition program module;

determining whether said audio input device is receiving audio;

if audio is being received by the audio input device, storing the audio data;

storing the audio data in a second memory storage device;

determining whether a command for activating said speech recognition program module has been issued; and if the command for activating the speech recognition program module has been issued, initiating a background audio program module for manipulating the stored audio data.

21. The background audio recovery system of claim 20, further comprising a stochastic input interface, said stochastic input interface translates commands issued from said application program for said speech recognition program.

22. The background audio recovery system of claim 20, wherein said secondary memory storage device includes a cache memory of a central processing unit.

23. The background audio recovery system of claim 20, wherein said processor is further operative to:

providing a list of options, said list of options includes said processor being operative for at least one of:

converting the stored audio data into text data;

displaying the text data on said display device, the text data including textual application program commands;

applying spoken commands present in the stored audio data to text data;

inserting the text data into an opened file being accessed by said application program; and deleting the stored audio data from a memory storage device.

24. The background audio recovery system of claim 20, further comprising an audio output device for playing back audio stored on said memory storage device.

* * * * *